No. 727,733. PATENTED MAY 12, 1903.
W. H. BAKER & F. E. KIP.
WARP AND WEFT STOPPING MECHANISM FOR LOOMS.
APPLICATION FILED NOV. 25, 1901.
NO MODEL. 5 SHEETS—SHEET 4.

No. 727,733. PATENTED MAY 12, 1903.
W. H. BAKER & F. E. KIP.
WARP AND WEFT STOPPING MECHANISM FOR LOOMS.
APPLICATION FILED NOV. 25, 1901.
NO MODEL. 5 SHEETS—SHEET 5.

William H. Baker
Frederic E. Kip
Inventors,

Witnesses
Bert C. Jones.
Charles W. Hildreth.

By their Attorney, Henry Connett

No. 727,733. Patented May 12, 1903.

UNITED STATES PATENT OFFICE.

WILLIAM H. BAKER, OF CENTRAL FALLS, RHODE ISLAND, AND FREDERIC E. KIP, OF MONTCLAIR, NEW JERSEY.

WARP AND WEFT STOPPING MECHANISM FOR LOOMS.

SPECIFICATION forming part of Letters Patent No. 727,733, dated May 12, 1903.

Application filed November 25, 1901. Serial No. 83,497. (No model.)

*To all whom it may concern:*

Be it known that we, WILLIAM H. BAKER, residing at Central Falls, Providence county, Rhode Island, and FREDERIC E. KIP, residing at Montclair, Essex county, New Jersey, citizens of the United States, have jointly invented certain new and useful Improvements in Warp and Weft Stopping Mechanism for Looms, of which the following is a specification.

This invention relates to a loom provided with detector devices for indicating the failure of the warp and weft, the said detector devices operating to set in operation mechanism that stops the loom. As herein shown, these detector devices operate electromechanically. It includes improved warp stop mechanism, a locking mechanism for the dagger set by the operating-magnet, means for indicating where the trouble exists when the loom is automatically stopped, an improved circuit-closing drop, and other specific features which will be hereinafter described.

All of the novel features of the invention will be carefully defined in the claims.

In the drawings which serve to illustrate embodiments of the invention.

Figures 1, 2, 3:
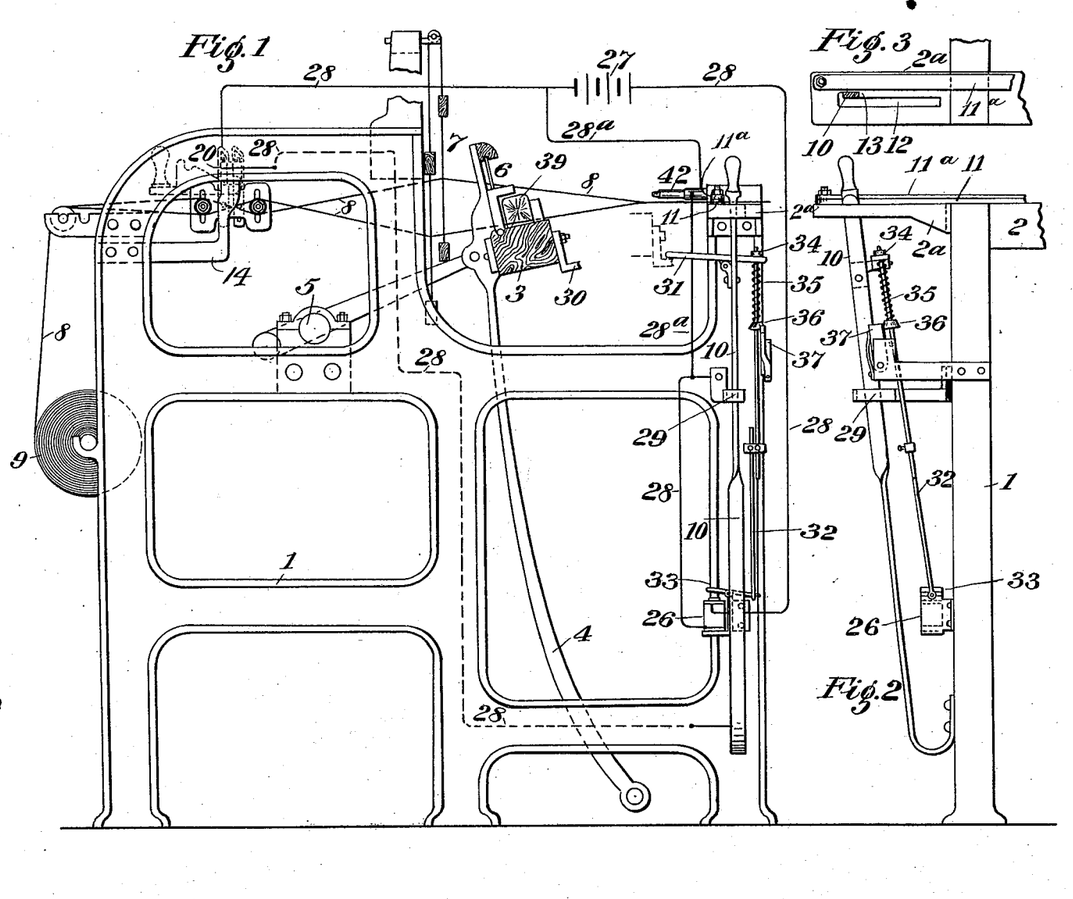
Figure 1 is a somewhat diagrammatic side elevation showing the left-hand side of a loom provided with the invention.
Fig. 2 is a front elevation of the left-hand side of same.
Fig. 3 is a plan of the slotted bracket in which the shipper-lever plays.
Figure 4:
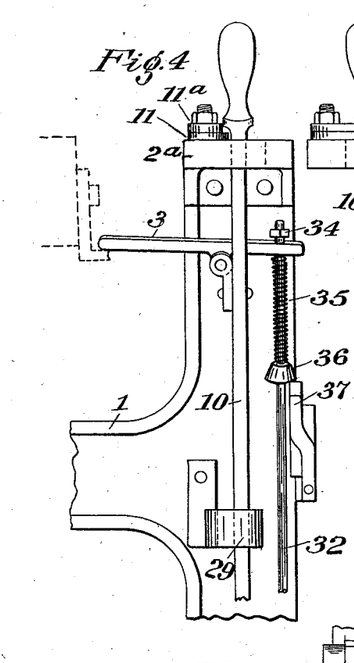
Figs. 4, 5, and 6 are enlarged detail views of a detaining device to hold the dagger in position until the shipper-lever is set free.

Referring primarily to Figs. 1 to 3, 1 is the loom-frame, 2 the breast-beam, forming a substantial part thereof. 3 is the lay, 4 is the lay-sword, 5 is the crank-shaft, from which the lay is operated, 6 is the reed, 7 is the harness, 8 the wraps, 9 the warp-beam, 10 the shipper-lever, and 11 the main knock-off lever. All of these parts in some form are common in looms. The shipper-lever plays along a slot 12, Fig. 3, in a bracket $2^a$, forming an extension of the breast-beam, when freed from its retaining-shoulder 13, and thus shifts a belt or clutch and stops the loom.

We will first describe the devices (best illustrated in Figs. 8 to 13) for detecting the breaking of a warp-thread by the falling of a drop suspended thereon.

Figures 8, 10, 12:
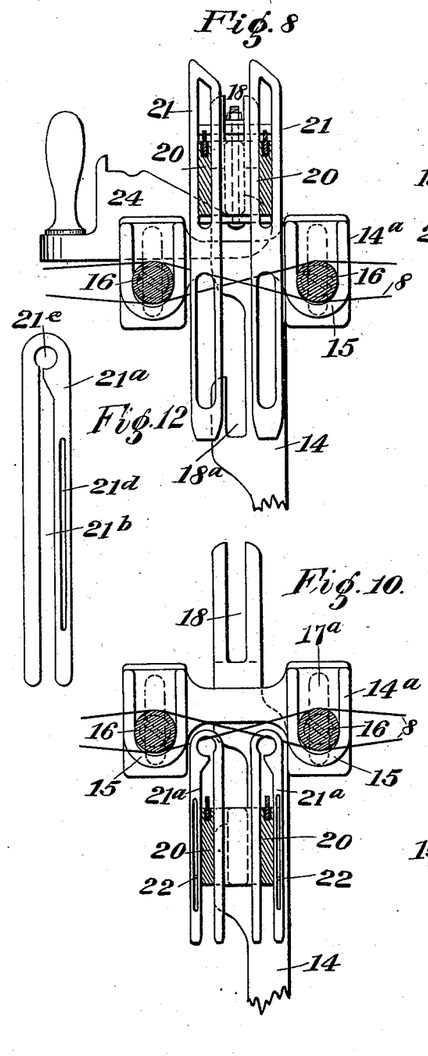
Figs. 8, 9, 10, and 11 are detail views of the brackets, the warp-supporting bars or rods, and the drops thereon.
Figs. 12 and 13 show two forms of drops.
Figures 9, 11, 13:
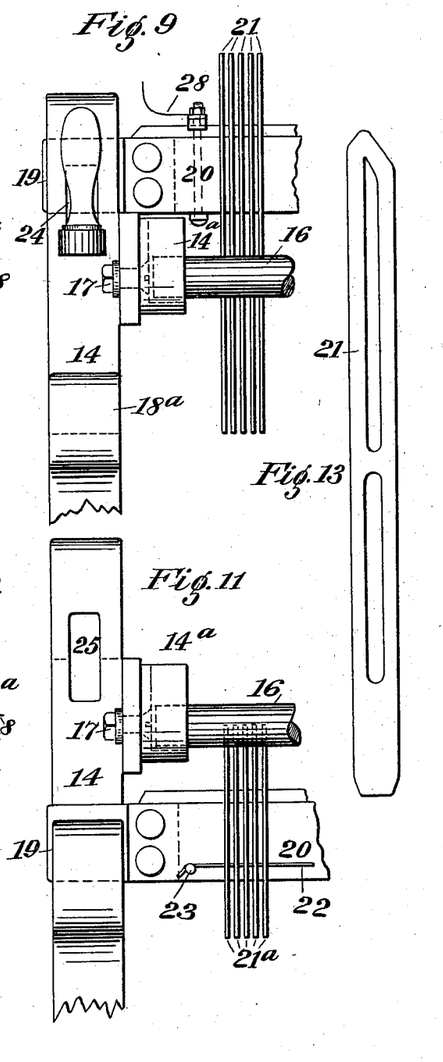

14 is one of a pair of brackets mounted on the loom-frame at its respective sides. Each bracket is provided with two sockets 15 at substantially the same level to receive the lease-rods 16 for supporting the crossed warp-threads. As here shown, the part $14^a$, having in it the pair of V-shaped sockets 15, is represented as secured so as to be adjusted vertically on the bracket 14 by bolts 17, playing in slots $17^a$ in the part $14^a$. In the bracket 14 is an upper keeper 18 and a lower keeper $18^a$. These keepers are directly in line vertically and are adapted to receive end pieces 19, to which are secured compound terminals 20, on which are guided the drops supported on the warp-threads. These compound terminals, with drops guided on them, are fully illustrated in our United States Patent No. 624,155 of May 2, 1899, and also in other patents granted to us. Where the drops are of such a character that the compound terminal or other guide is to be placed above the warp, the end pieces thereof are mounted in the upper keepers 18 in the brackets 14. The drop 21 adapted for this arrangement is seen in Figs. 8, 9, and 13. In this drop the slot for the guide 20 is at the upper part and that for the warp-thread is below it. Figs. 10, 11, and 12 show an arrangement of the parts where the aperture for the thread in the drop is above the slot for the guide or terminal. Fig. 12 shows this drop 21ᵃ detached. To employ this form of drop, the end pieces to which the terminals 20 are secured are mounted in the lower keepers 18ᵃ in the brackets 14, as clearly shown in Figs. 10 and 11. The guide-slot 21ᵇ in the drop 21ᵃ is open at the bottom and is connected with the thread-aperture 21ᶜ by a slot, so that the drop may be passed down over the warp-thread. To prevent the drops from being thrown upward off the thread by the jerking movements of the latter, the drop is provided with an auxiliary slot 21ᵈ alongside of the guide-slot, and through these alined slots 21ᵈ a wire 22 is drawn, strained taut, and then secured at its ends, as indicated at 23 in Fig. 11. This wire prevents the drops from jumping off the threads and at the same time permits them to play freely up and down to a limited extent. When the terminals are above the warp-threads, as in Figs. 8 and 9, it is desirable to provide convenient means for elevating them, so as to afford access to the warp for repairing a broken warp-thread, and to properly effect this object a tapering key 24 is provided. This key is inserted in a cross-mortise 25 through the walls of the upper keeper 18, the key passing under the end piece 19 of the compound terminal. There will of course be a key 24 at each side of the loom and normally the end pieces rest on the keys near their reduced ends or tips.

We do not limit ourselves specifically to the above-described means for elevating the terminals, as it will be obvious to any one skilled in the art that other means can be employed for the purpose.

Our device may of course be employed with other forms of stop-motions.

Figure 5:
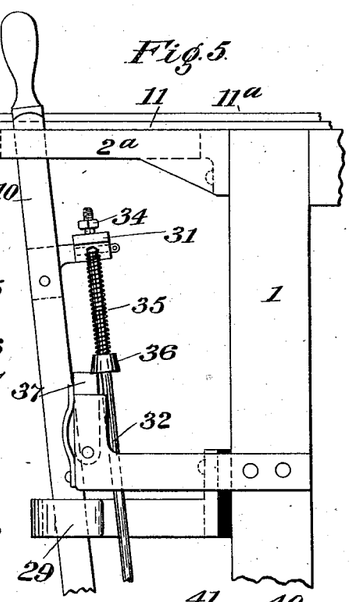
Figure 6:
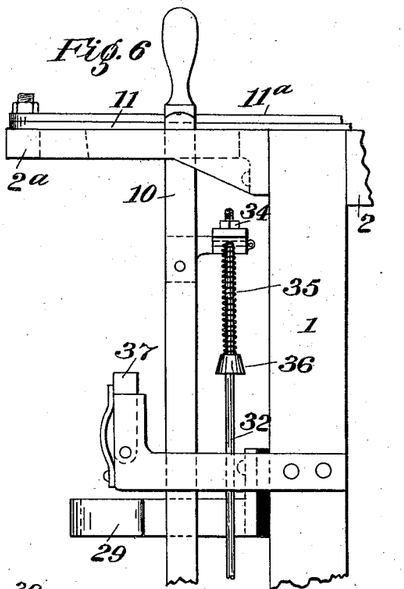
Figure 14:
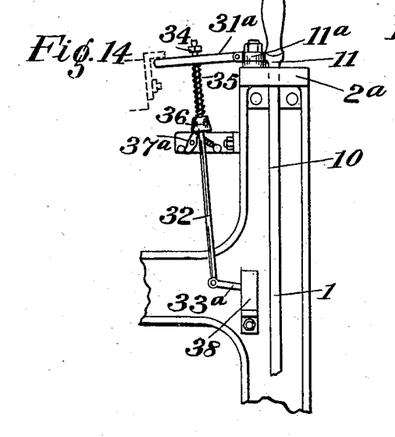
Figs. 14 and 15 are views similar to Fig. 4, but illustrating a construction where the dagger is hinged to the knock-off lever.
Figure 15:
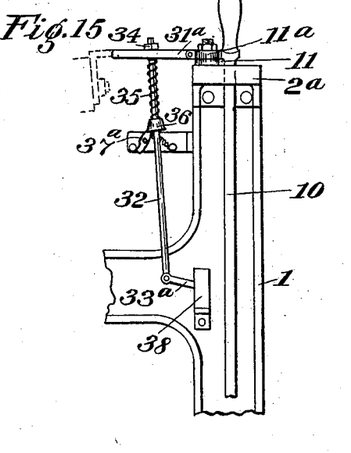

We will now describe the means whereby the loom-stopping mechanism is actuated through the breaking of a warp-thread, referring especially to Figs. 1 to 6. On some fixed part, preferably the loom-frame, is mounted an electromagnet 26 in circuit with a generator 27. The circuit has as its terminals the elements of the compound terminals 20. It need only be said of the circuit 28 that the current flows from one pole of the generator 27 by a conductor to the electromagnet 26, thence through the coils of said magnet, thence through a contact-plate 29 to the shipper-lever 10, thence through the metal frame of the loom (see dotted lines in Fig. 1) to one element or terminal of the compound terminal 20, thence through a fallen drop to the other element or terminal of the compound terminal, and thence to the other pole of the generator. It may be stated here that when the shipper-lever is in its normal position (seen in Fig. 1) and the loom is running the said lever will be in electrical contact with the contact-plate 29, (which is insulated from the metal loom-frame,) but when the shipper-lever shifts in stopping the loom it wipes off from the plate 29 and breaks the circuit at this point. Mounted on the lay 3 or on some other moving part of the loom is a bunter 30, and fulcrumed on the shipper-lever 10 is a lever-like dagger 31, which may be depressed at its operative end until it is in the path of said bunter, whereby when the bunter advances it will impinge upon the dagger and set free the shipper-lever. The other arm of the dagger is coupled by a rod 32 to an arm of the armature-lever 33 of the magnet 26. The weight of the rod 32 suffices to elevate the armature of the magnet and also the operative end of the dagger. It may happen that the circuit will be closed by the breaking of a warp-thread at a time when the bunter 30 is out of position, and it is desirable that when the magnet is excited and the rod 32 moved upward thereby a detaining device shall be provided to hold said rod elevated until the shipper-lever is set free and shifts. This device will now be described with especial reference to Figs. 4, 5, and 6. The rod 32 is hinged below to the armature-lever and at its upper end it plays through an aperture in the arm of the dagger, being provided with head or nut 34. Below the arm of the dagger is a coil-spring 35, which abuts below on a shouldered collar or block 36 on the rod. Normally this block 36 bears against the face of a pivoted spring-latch 37 on the loom-frame, as seen in Fig. 2; but when the rod is pressed upward the block wipes past this latch and the latter takes under the block, as seen in Fig. 5, the latch thus sustaining the rod 32 elevated. If it should happen, as indicated in dotted lines in Fig. 4, that the bunter 30 is advanced so that the dagger cannot be depressed, the spring 35 will yield, and as soon as the bunter withdraws the said spring will depress the dagger into the path of the bunter. When the shipper-lever shifts, (see Fig. 6,) the block 36 leaves the latch 37, and the rod 32 again drops. Figs. 14 and 15 show this detaining device as employed in connection with a dagger 31ᵃ, hinged to an auxiliary knock-off lever 11ᵃ instead of to the shipper-lever. In this form of the device the armature-lever and dagger are represented as levers of a different class from those before described, but the operation and function performed are the same. The rod 32, nut 34, spring 35, and block 36 are the same as described with respect to Figs. 4, 5, and 6; but in lieu of the spring-latch 37 of the construction of the latter there is an upright spring-latch 37 mounted on a bracket on the frame, and this latch takes at its upper end under the block 36.

Figures 16, 17, 18:
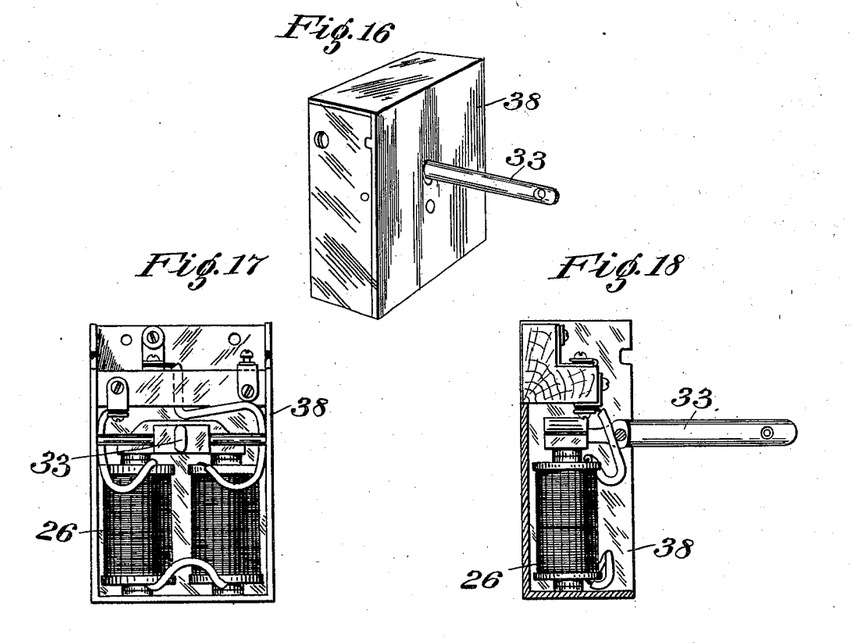
Fig. 16 is a perspective view of the operating-magnet and its casing.
Figs. 17 and 18 are sectional detail views of the same.

In the diagrammatic views Figs. 1 and 2 it has been found convenient to show a simple magnet 26 mounted on the loom-frame; but for convenience in fitting up the loom the magnet is inclosed in a box or casing 38, as illustrated in Figs. 16, 17, and 18, where the armature-lever is represented as protruding through a slot in the cover of the casing.

Figure 7:
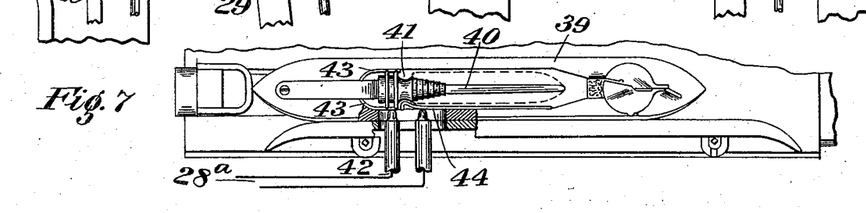
Fig. 7 is a detail view illustrating the manner of closing the circuit at the shuttle when the weft is substantially exhausted.

Fig. 7 shows one known form of electrical device for detecting the substantial exhaustion of weft on the bobbin of the running shuttle. It need only be said of this device that 39 is the shuttle, 40 is a bobbin therein provided with a metallic covering at 41, as indicated in our Patent No. 681,165 of August 20, 1901. Two terminals 42 of a circuit 28ª, including the generator 27 and the electromagnet 26, are adapted to enter coincident apertures in the shuttle-box and shuttle when the lay beats up. One of these terminals impinges on one of the spring-jaws 43, which hold the bobbin in place and which are in electrical connection with the metallic covering or part 41, and the other impinges on a spring-contact 44 in the shuttle and presses the latter normally against the weft on the bobbin; but when the weft shall have become exhausted to a predetermined extent this spring 44 will be pressed into contact with the metal 41 on the denuded bobbin, and the circuit 28ª thus closed through the magnet 26. The loom is then "knocked off" or stopped, so that fresh weft may be supplied. Thus the loom-stopping device is common to both the warp-break-detecting and weft-exhaustion-detecting devices.

Figure 19:
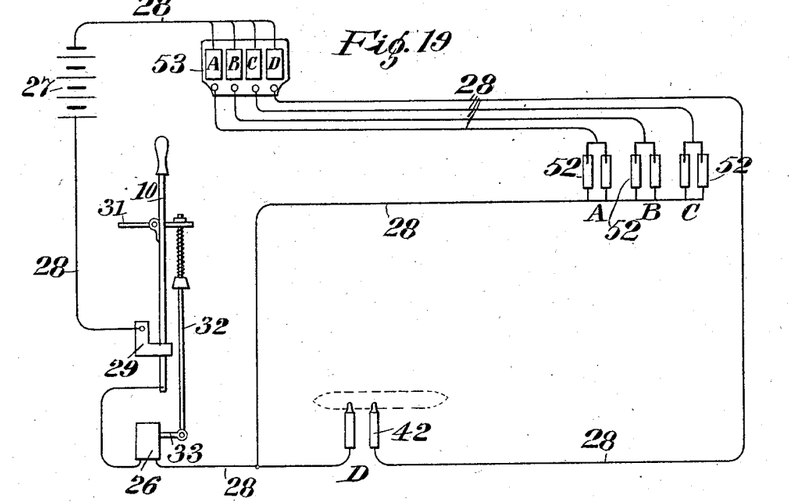
Fig. 19 is a diagrammatic view of the circuits through the annunciators.
Figure 20:
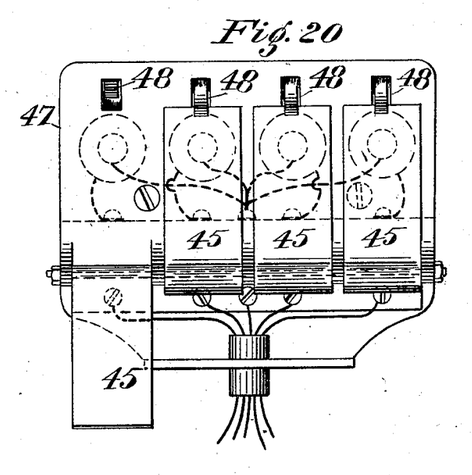
Figs. 20 and 21 are respectively a front view and vertical section view of the annunciator on a larger scale than Fig. 19.
Figure 21:
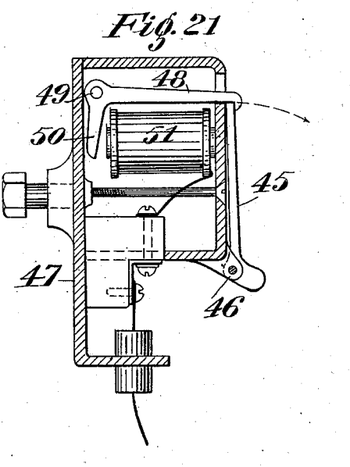

The part 22 will usually be of copper wire, but in the term "wire" as herein employed for designating this part we wish to include as well any strip, rod, or mechanical equivalent of wire. The rod 32 is shown in Figs. 1 and 2 as in two parts coupled together so as to be varied in length for adjustment, but this is not important to the invention.

Where the loom may be stopped or knocked off from any one of a number of causes—as, for example, by the breaking of the filling-thread, the substantial exhaustion of filling in the running shuttle, or the parting of a warp-thread at any one of several points where groups of drops are situated—it is important that the attendant should know at the moment the loom stops where to look for the cause of the stoppage. This object is attained by the means illustrated in Figs. 19, 20, and 21, which we may call, for convenience, the "annunciator devices." Fig. 21, in connection with Fig. 20, illustrates a simple electrical annunciator device which may consist of any number of like annunciators. Each annunciator comprises a gravity drop-plate 45, hinged at 46 to a common casing or box 47. Normally this drop-plate is held up to the position seen in Fig. 21 by a gravity hook-lever 48, hinged at 49 in the box and provided with an armature-arm 50 in front of the pole of an electromagnet 51. When the magnet 51 is excited, it attracts the armature 50, elevates the hook-lever 48, and allows the drop-plate 45 to fall. One of the plates 45 is shown pendent or fallen at the left in Fig. 20. This figure, as well as Fig. 19, shows four annunciators with one box or casing in common, but there may be any number of these, one or more. In Fig. 19 are shown three groups 52 of drops for the warp-threads, at either of which a drop may fall. Each of these groups is provided with an annunciator, so that the attendant may know at which one the warp-thread has parted. For convenience of reference in Fig. 19 one group is designated by A and its annunciator designated by A. Another is designated by B and the third by C, their respective annunciators being designated by the same letters. The closure of the circuit through the terminals 42 when the weft in the shuttle is substantially exhausted is announced by an annunciator D. The circuits are so simple that it will not be necessary to trace them. It need only be said that the several magnets 51 of the annunciators are in branches of the circuit 28, which includes the generator 27 and magnet 26. Thus the completion of the circuit at either of the groups 52 or at the terminals 42 will cause the drop-plate of the appropriate annunciator to fall. In Fig. 19 the group of annunciators is designated by 53. Obviously the drop-plates of the different annunciators may be differently colored on their inner faces or otherwise significantly marked, so that the attendant may know instantly where to look for the trouble. If there are pile-warps and groups of drops on them, as shown in our Patent No. 635,637 of October 24, 1899, these groups may have, of course, corresponding annunciators.

We do not, of course, restrict ourselves to precisely the kind of annunciators herein illustrated; but this is a simple form and wholly devoid of springs.

We have shown in Fig. 7 one form of electromechanical filling-exhaustion-indicating device. The invention is, however, equally well adapted to any other known form of filling-exhaustion-indicating device.

Prior to this invention great inconvenience has been experienced by textile mills from their inability to put in the same loom all classes of warp from the coarsest to the finest and equip them with the same warp stop-motion, for the reason that on the coarse grades of warp-yarns a large quantity of lint or fluff accumulates, and this prevents proper action of the drop devices and loom-stopping mechanism. Also these coarse yarns are usually very compact, and it requires a drop having considerable weight to always insure its falling. On the other hand, the very fine counts of yarn, being made from a longer staple, contain little or no lint, and yet these fine grades of yarn are very delicate and will not stand such weight thrown on them as is necessary in the drops for the coarser yarns. With our present invention we overcome this difficulty and provide a warp stop-motion which, once placed on a loom, enables such loom to weave from the coarsest to the finest grades of yarn. In Fig. 8 we show the preferred construction for very coarse yarns, which require a heavier drop, and on account of our electrodes or actuating parts being above the warp no lint or fluff can accumulate to prevent proper action of the drops and loom-stopping mechanism. In case a medium or very fine warp-yarn is next put into the loom all that is necessary to accomplish this result is that a drop of lighter weight, such as that illustrated in Fig. 10, be employed, and the electrode or actuating parts will be in that case put in the lower keepers of the brackets 14.

We are the first, as we believe, in a warp stop-motion, to employ an adjustable bracket having two keepers at different elevations, and we desire to claim this feature broadly.

We believe that we are the first in this art to supply to a loom a filling-exhaustion-indicating device which acts previous to entire absence of the weft and a device to indicate the parting of a warp-thread and means actuated by either or both of these devices in common to set in operation the stopping mechanism of the loom, and we therefore claim the same broadly and without limitation to specific means for accomplishing the result.

We have shown herein the devices to actuate the loom-stopping mechanism as attached to the shipper-lever and the knock-off lever; but other known ways for mounting same may be employed instead.

In very fast running looms, particularly where same are not on a firm foundation, there is considerable vibration both laterally and vertically, and often just at the moment when the bunter should coöperate with the lever to stop the loom the circuit is momentarily broken by this vibration, and the loom may therefore run a number of picks after a drop has fallen before the loom stops. Our present invention obviates this fault in a warp stop-motion, as at the moment a drop falls and the circuit is closed the actuating device is locked and remains locked until the loom is stopped, independently of whether the circuit is then open or closed. The loom-stopping mechanism in acting to stop the loom automatically unlocks said device, and we therefore wish it understood that this locking loom-stopping-actuating device is equally well adapted for use with any ordinary warp stop-motion. Of course the locking device operates precisely the same whether the magnet is excited from failure of the filling in the shuttle or failure of the warp.

In practice much delay is experienced by the weaver being compelled when the loom stops to search in several places for the cause thereof, and as the object is in all forms of automatic looms to save labor by being able to increase the number of looms under the care of one attendant any device that saves the time of said attendant or prevents useless waste, as our indicating devices do, is of great value, as it increases the ability of the attendant to mind more looms, and thereby decreases the cost of production, and as we are, as we believe, the first to provide a loom with a telltale or indicating device which indicates the locality that causes the loom to stop we desire to claim same broadly without reference to special means for accomplishing the result.

It is customary in using drops or drop devices in warp stop-motions to arrange the drops in "groups" or "banks," so called, and in the present invention the indicators show in which particular bank a drop has fallen by the parting of a warp-thread.

We have illustrated herein, as before stated, electromechanical means for detecting a parted or substantially exhausted thread; but we wish it understood that our invention is not wholly limited to such means. Our mechanism for indicating the particular cause for the stopping of the loom may be used with various forms of warp and weft stop-motions.

Having thus described our invention, we claim—

1. A loom having means independent of the shuttle for detecting and indicating the parting of a warp-thread, means dependent on the shuttle for detecting and visually indicating the exhaustion to a predetermined extent of the filling in the running shuttle, a loom-stopping mechanism, and intermediate mechanism common to both of said detecting means, for actuating said loom-stopping mechanism.

2. A loom having two controlling electric circuits including a generator and a single operating-electromagnet, a loom-stopping mechanism controlled by said magnet, means independent of the shuttle for completing one of said circuits through the magnet when a warp-thread breaks, means dependent on the shuttle for completing the other circuit through the magnet when the filling in the running shuttle is exhausted to a predetermined extent, and means actuated by the closing of said circuits for visually indicating the point in the loom where the particular circuit is closed.

3. In a loom, the combination with the shipper-lever, a moving part of the loom and a bunter mounted thereon, of a hinged dagger adapted to be moved into and out of the path of said bunter, an operating-electromagnet, its armature-lever, a rod coupled at one end to said armature-lever, and having at its other end an elastic yielding connection to the dagger, and means for detaining said rod after it has been actuated by the armature-lever, said means comprising a shoulder on the rod and a spring-latch to take under said shoulder.

4. In a loom, the combination with the shipper-lever, the dagger fulcrumed thereon, the electromagnet, its armature-lever, the rod 32 hinged to said lever at its lower end and playing at its upper end through an aperture in said dagger, the head on said rod, the collar or block 36 on the latter, the spring 35 between said block and the dagger, and the spring-latch 37, of the lay, the bunter thereon, and means for exciting said magnet.

5. In a warp stop-motion for looms, the combination with a bracket 14, having two keepers 18 and 18ª, of the adjustable socket-plate 14ª mounted thereon, the lease-rods, and the connected terminals.

6. In a warp stop-motion, the combination with drop devices normally supported by unbroken warp-threads, and means when said drop devices assume an abnormal position due to the parting of a warp-thread, for stopping the loom, of a guide-bar for said drop devices situated above the warp-threads, and means for increasing or diminishing the elevation of said guide-bar in order to provide room to mend parted warp-threads.

7. In an electrical warp stop-motion for looms, the combination with an electric circuit, of drop devices normally supported by unbroken warp-threads, means, when said drop devices fall due to parting of warp-thread, for making said electric circuit active to actuate loom-stopping mechanism to stop the loom, of a guide-bar or electric terminal for said drop devices, situated above the warp-threads, and means for increasing or diminishing the elevation of said guide-bar to facilitate mending of parted warp-threads.

8. In a loom, the combination with a moving part acting as a bunter, of a dagger adapted to be moved into and out of the path of said bunter, an operating-electromagnet, its armature-lever, and a locking device coacting therewith, and means to actuate same to positively insure the coöperation of the dagger with the bunter when the circuit is closed through the said magnet.

9. In an electrical stop-motion for looms, the combination with an electric circuit and a controlling-electromagnet having a balanced armature-lever, a shipper-lever, and a knock-off lever, of a balanced lever-like dagger mounted on the shipper-lever, a connector and locking device between said dagger and armature-lever, and means to actuate said locking device to positively insure the coöperation of the dagger with the bunter when the circuit is closed through said magnet.

10. In a warp stop-motion, the combination with a bracket having two keepers arranged at different elevations and adapted to receive guide-bars for drop devices, as and for the purposes set forth.

11. A loom having a stopping mechanism, detector mechanisms for automatically setting in operation the stopping mechanism when a thread fails or parts in the weaving, said mechanisms being situated at different points, a visual indicator for each of said points, and operative means between the respective indicators and the detector mechanisms at the several points, whereby the failure or parting of a thread at any point will be indicated to the attendant in charge of the loom.

12. A loom having a stopping mechanism, detector mechanisms for automatically setting in operation the stopping mechanism when a thread fails or parts in the weaving, said mechanisms being situated at different points, a visual indicator for each of said points, and electromagnetic operative means between the respective indicators and the detector mechanisms at the several points, whereby the failure or parting of a thread will be indicated to the attendant in charge of the loom.

13. A loom having a stopping mechanism, mechanisms for detecting the parting of warp-threads, arranged in groups at different points and setting in operation the stopping mechanism, a visual indicator for each of said groups, and operative means between each of said groups and its indicator, which operates the indicator when a warp-thread parts, whereby the position of the break in the warp is indicated to the attendant in charge of the loom.

14. A loom having a stopping mechanism, circuit-closing drop devices which detect the parting of the warp-threads, said drop devices being in groups at different points, the circuits, electromechanical means actuated by the closing of the circuit for stopping the loom, and an electromagnetic indicator in circuit with each group of circuit-closers and adapted to be actuated by the closing of the circuit through it, whereby the attendant at the loom is directed to the group where the break exists, substantially as set forth.

15. In a loom, the combination with a loom-stopping mechanism, and electromechanical means situated at different points for setting in operation said stopping mechanism when a thread fails or parts, of electromechanical means to detect and visually announce the particular point where the failure or parting of the thread has occurred.

16. In a loom, the combination with a loom-stopping mechanism, of electromechanical means situated at different points on the same loom for setting in operation the loom-stopping mechanism, and electromechanical means to announce the particular point in the loom where the cause exists which effected the stopping of the loom.

17. In a loom, the combination with a loom-stopping mechanism, and a plurality of means or devices situated at different points on the same loom for setting in operation said loom-stopping mechanism to stop the loom, and means to announce the particular point where the device is situated which caused the loom to stop.

18. A loom having mechanisms for detecting the parting of the warp-threads and arranged in groups at different points in the loom, a visual indicator for each of said groups, and operative mechanism between each of said groups and its indicator which operates the indicator when a warp-thread breaks or parts, whereby the position of the break in the warp is indicated to the attendant in charge of the loom.

19. In a loom, the combination with a loom-stopping mechanism and a plurality of means, situated in groups or banks on the same loom for setting in operation said loom-stopping mechanism to stop the loom, and means to announce the particular location of the means which caused the loom to stop.

20. In a warp stop-motion, the combination with drop devices normally supported on unbroken warp-threads and arranged in groups or banks, means when said drop devices fall, for stopping the loom, and means for indicating the location of the bank which contains the fallen drop that caused the loom to stop.

21. In a warp stop-motion, the combination with electromechanical means to operate the loom-stopping mechanism when a drop device falls, of said drop devices arranged in groups or banks and electromechanical means for visually indicating the bank in which may be found the fallen drop which effected the stoppage of the loom.

22. In a warp stop-motion, the combination with electromechanical means to operate the loom-stopping mechanism when a drop falls, of said drops arranged in groups or banks, and means for indicating the location of the bank in which may be found the fallen drop which caused the loom to stop.

In witness whereof we have hereunto signed our names, this 20th day of November, 1901, in the presence of two subscribing witnesses.

WILLIAM H. BAKER.
FREDERIC E. KIP.

Witnesses:
PETER A. ROSS,
H. ALAN CONNETT.